United States Patent [19]

Hart et al.

[11] Patent Number: 4,865,533
[45] Date of Patent: Sep. 12, 1989

[54] APPARATUS FOR FABRICATING A WIDE-MOUTH PLASTIC CONTAINER FROM A STRETCH BLOW-MOLDED INTERMEDIATE ARTICLE

[75] Inventors: Philip G. Hart; Virgil L. Davis, both of Hartsville, S.C.

[73] Assignee: Sonoco Products Company, Hartsville, S.C.

[21] Appl. No.: 130,310

[22] Filed: Dec. 9, 1987

[51] Int. Cl.⁴ .............................................. B29C 49/74
[52] U.S. Cl. ................................... 425/527; 215/1 C; 264/161; 264/536; 425/301; 425/307; 425/806; 428/36.92
[58] Field of Search ............... 425/527, 534, 806, 292, 425/301, 306, 307; 264/536, 532, 161; 428/35; 215/1 C

[56] References Cited

U.S. PATENT DOCUMENTS

| | | | |
|---|---|---|---|
| Re. 29,065 | 12/1976 | Uhlig | 264/536 X |
| 1,195,504 | 8/1916 | Gleason | 425/806 X |
| 1,783,047 | 11/1930 | Marshall | 51/290 X |
| 2,984,865 | 5/1961 | Mumford | 264/536 |
| 3,241,193 | 3/1966 | Pohlman | 425/806 X |
| 3,351,981 | 11/1967 | Rupert | 425/806 X |
| 3,375,551 | 4/1968 | Sherlock | 425/298 |
| 3,540,371 | 11/1970 | Rudolph et al. | 425/527 X |
| 3,769,394 | 10/1973 | Latreille | 264/536 X |
| 3,783,724 | 1/1974 | Uhlig | 425/808 X |
| 3,949,034 | 4/1976 | Uhlig | 264/536 X |
| 4,095,927 | 6/1978 | Roberg et al. | 425/527 X |
| 4,496,064 | 1/1985 | Beck et al. | 264/530 X |
| 4,497,622 | 2/1985 | Grebowiec | 264/536 X |
| 4,508,499 | 4/1985 | Spengler | 425/527 X |
| 4,539,463 | 9/1985 | Piccioli et al. | 264/536 X |
| 4,549,066 | 10/1985 | Piccioli et al. | 425/527 X |
| 4,587,763 | 5/1986 | Hahn | 51/290 X |

Primary Examiner—Richard L. Chiesa
Attorney, Agent, or Firm—Bell, Seltzer, Park & Gibson

[57] ABSTRACT

An apparatus is provided for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion. The apparatus provides for a two stage cutting and trimming operation which produces a precision concentric uniform flange around the wide-mouth of the fabricated container and provides for alternately and simultaneously performing the fabricating operations to provide a desired speed of operation of the apparatus.

9 Claims, 5 Drawing Sheets

FIG-11

# APPARATUS FOR FABRICATING A WIDE-MOUTH PLASTIC CONTAINER FROM A STRETCH BLOW-MOLDED INTERMEDIATE ARTICLE

FIELD OF THE INVENTION

This invention relates to an apparatus and method for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion. The apparatus and method are characterized by a two stage cutting and trimming operation which produces a precision concentric uniform flange around the wide-mouth of the fabricated container and, preferably, with a desired high speed operation provided by alternate and simultaneous fabricating operations.

BACKGROUND OF THE INVENTION

As fully explained in co-pending application Ser. No. 129,706, filed Dec. 7, 1987, and assigned to the assignee of the present application, stretch blow-molding of plastic injection-molded preforms, particularly polyethylene terephthalate (PET), is highly desirable when manufacturing plastic containers for packaging contents under pressure, such as tennis balls, food and beverage products, etc. It has also been determined, in the manufacture of such plastic containers with a wide-mouth having a radially-extending flange at the wide-mouth for receiving end closures including metal end closures by double seaming operations, that it is desirable to first stretch blow-mold an intermediate article having a dome-like accommodation portion extending radially-outwardly at a flange area and upwardly and inwardly from the wide-mouth of a generally cylindrical body portion. A full explanation of the reasons and advantages for first forming an intermediate article with the dome-like accommodation portion for ultimately fabricating into wide-mouth containers with annular flanges is fully explained in the above mentioned co-pending application of the assignee of the present application.

Heretofore, the accommodation portion has been annularly cut and removed from the intermediate article to form the resulting wide-mouth container with an annular flange by a variety of operations including a single stage mechanical cutting operation, as disclosed for example in U.S. Pat. Nos. 4,496,064 and 3,783,724, a single stage laser cutting operation, as disclosed for example in U.S. Pat. Nos. 4,539,463 and 4,549,066, etc. However, all of these prior operations for removing the accommodation portion from an intermediate stretch blow-molded article to fabricate a wide mouth plastic container having an annular flange at the wide-mouth for receiving an end closure have suffered from one or more drawbacks including particularly the failure to produce a concentric uniform cut flange around the wide-mouth, often because the stretch blow-molded intermediate article and dome-like accommodation portion are not truly round as they come from the stretch blow-molding operation which results after the cutting operation in a flange around the wide-mouth of the container which does not properly receive an end closure, such as a metal end closure by double seaming operations. Also, many of these operations have not enjoyed a desired high speed of fabrication for assembly line production of the wide-mouth containers.

OBJECT AND SUMMARY OF THE INVENTION

Accordingly, it is the object of this invention to overcome the above problems with prior apparatus and methods for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and which provides an apparatus and method for such fabrication which produces a precision concentric uniform flange around the wide-mouth of the container and, preferably, a desired high speed operation.

It has been found by this invention that the above object may be accomplished by providing an apparatus and method including generally the following.

A first device is provided for receiving the intermediate article and for annularly cutting the accommodation portion through the flange area to remove the remainder of the accommodation portion and to leave an annular flange around the wide-mouth of the resulting container. A second device is provided for receiving the resulting container, for rounding and centering the wide-mouth of the container and for trimming the cut flange to a precision concentric uniform flange.

Preferably, the first device includes a hollow inverted stationary circular rule die cutting means for receiving the intermediate article therein with the flange area of the accommodation portion resting on the rule die cutting means. There is further included a pressure plate means having an internal bore and mounted for reciprocating movement toward the rule die cutting means for receiving the dome-like accommodation portion within the internal bore to generally center the intermediate article in the rule die cutting means and for compressing at least two wall thicknesses including the flange area of the accommodation portion against the rule die cutting means during movement of the pressure plate means for cutting the accommodation portion through the flange area by the rule die cutting means and utilizing the other compressed wall thickness as an anvil means. Preferably, there is further included stop means mounted for cooperating with the rule die cutting means and the pressure plate means for stopping movement of the pressure plate means toward the rule die cutting means at a position to ensure cutting of substantially only the wall thickness of the flange area by the rule die cutting means during compression of the accommodation portion.

The second device includes a stationary hollow female circular die cutting means for receiving therewithin the wide-mouth container with the cut flange resting on the female die cutting means. A matched circular male die cutting means is mounted for reciprocating axial movement toward and into the female die cutting means for cooperating therewith to trim the cut flange of the wide-mouth container. A generally cylindrical pilot means is provided which has an outside diameter only slightly smaller than the inside diameter of the wide-mouth container and mounted for axial movement with said male die cutting means to enter the container through the wide-mouth for rounding and centering the wide-mouth of the container during trimming by the male and female die cutting means to form the precision concentric uniform flange.

In order to provide for the desired speed in this fabricating operation, the apparatus preferably includes provisions for alternately and simultaneously performing the above described fabricating operations. In that regard, the apparatus may include a conveyor for receiving and feeding a plurality of the intermediate articles forwardly in a generally linear horizontal path of travel into the apparatus and which includes means for releasing the intermediate article for generally downward vertical movement. A first carriage mechanism is positioned under the first conveyor and is mounted for reciprocating generally horizontal movement between two positions for receiving the intermediate articles in each of the two positions from the first conveyor and alternately reciprocating the articles outwardly in opposite directions to two respective cutting positions. At least two of the first cutting devices, described above, are positioned to alternately cooperate with the first carriage mechanism when the first carriage mechanism has received the intermediate articles and moved the articles to the respective cutting positions for annularly cutting the accommodation portion of the intermediate articles, as described above. A second carriage mechanism is positioned under the first carriage mechanism and is mounted for reciprocating generally horizontal movement between two positions for alternately receiving the cut containers from the first carriage mechanism in each of the two positions and reciprocating the cut containers outwardly in opposite directions to respective trimming positions. At least two of the above described second trimming devices are positioned to alternately cooperate with the second carriage mechanism when the second carriage mechanism has received the cut containers and moved the containers to the respective trimming positions for rounding and centering the wide-mouth of the container and for trimming the cut flange to a precision concentric uniform flange, as discussed above. A second conveyor or other suitable mechanism may be provided for removing the fabricated containers from the apparatus.

Preferably, the first carriage means receives a plurality of the intermediate articles in each of the two positions, there are a plurality of the first cutting devices corresponding to the number of intermediate articles, received by the first carriage mechanisms for alternately cooperating with the first carriage mechanism in each of the respective cutting positions, the second carriage mechanism receives in each of its respective positions the plurality of cut containers from each of the cutting positions of the second carriage mechanism, and there are a plurality of the second trimming devices corresponding to the number of cut containers received by the second carriage mechanism in each of its respective trimming positions for cooperating with the second carriage mechanism in each of its respective trimming positions.

BRIEF DESCRIPTION OF THE DRAWINGS

While some of the objects and advantages along with a summary of this invention have been set forth above, other objects and advantages along with a detailed description of a preferred embodiment of this invention will be described below in conjunction with the following drawings, in which.

DETAILED DESCRIPTION OF THE PREFERRED EMBODIMENT OF THE INVENTION

Figure 1:
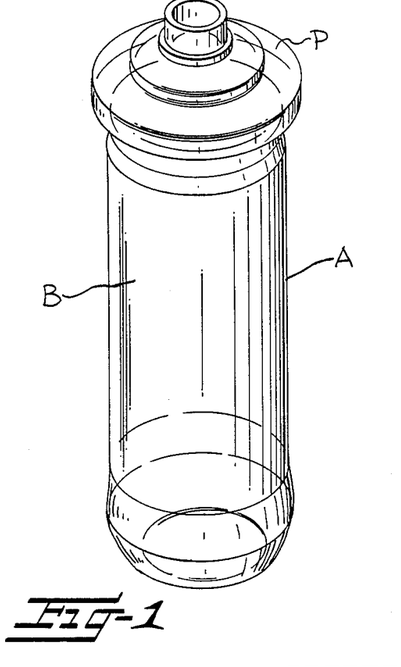
FIG. 1 is a perspective view of a stretch blow-molded intermediate article utilized by the apparatus and method of this invention for fabricating a wide-mouth container.
Figure 2:
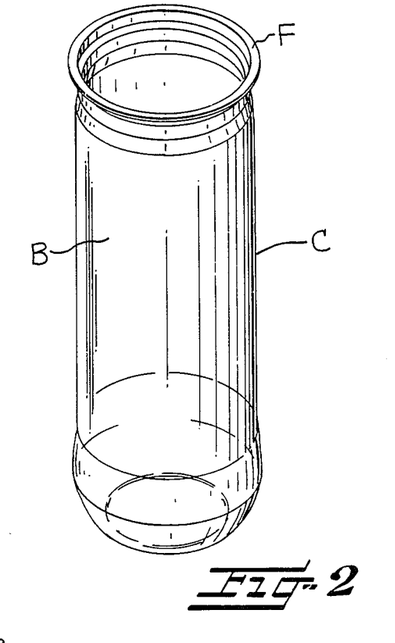
FIG. 2 is a perspective view of the wide-mouth container fabricated by the apparatus and method of this invention from the intermediate article of FIG. 1.
Figure 3:
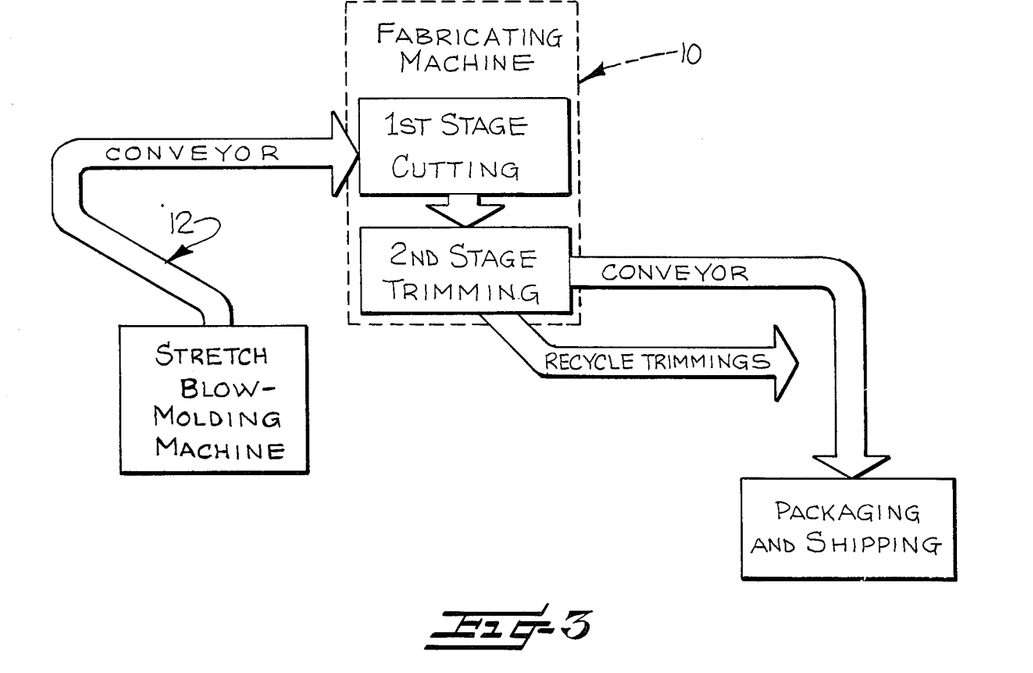
FIG. 3 is a schematic block flow diagram illustrating the operation of the apparatus and method of this invention.

Referring now to the drawings, there is disclosed in FIGS. 3–11 an apparatus, generally indicated at 10, for fabricating a wide-mouth plastic container C (FIG. 2), having an annular flange F extending radially outwardly at the wide-mouth, from a stretch blow-molded intermediate article A (FIGS. 1 and 6), having a dome-like accommodation portion P extending radially-outwardly at a flange F area and upwardly and inwardly from the wide-mouth of a generally cylindrical body portion B. The bottom of the wide-mouth container C and the intermediate article A are closed during the stretch blow-molding into any suitable base construction including the "champagne" type base illustrated in the drawings. Full details of the construction of the wide-mouth container C and the intermediate article A are contained in assignee's above identified co-pending application incorporated herein by reference.

The apparatus 10 receives the intermediate articles A from a stretch blow-molding machine (schematically indicated in FIG. 3) by way of a conveyor mechanism 12 which receives and feeds a plurality of the intermediate articles forwardly in a generally linear horizontal path of travel into the apparatus 10. This conveyor mechanism 12 (FIGS. 4 and 5) may include a driven screw mechanism 13 positioned on one side of the intermediate articles A and a rail 14 positioned on the other side of the intermediate articles A, so that the accommodation portion P is received by the screw mechanism 13 and rail 12 and the articles A are moved forwardly as the screw mechanism 13 rotates. The conveyor 12 further includes a device for releasing the intermediate articles A for generally downward vertical movement in the apparatus 10 which may be in the form of a piston and cylinder mechanism 15 connected to the rail 14 for being actuated to move the rail away from the intermediate articles A and allow the intermediate articles A to move downwardly under the force of gravity into the apparatus 10 through a chute 16.

The intermediate articles A are then received in a first stage cutting operation wherein the intermediate articles A are annularly cut through the flange F area of the accommodation portion P to remove the remainder of the accommodation portion P and to leave an annular flange F around the wide-mouth of the resulting container C.

Figure 5:
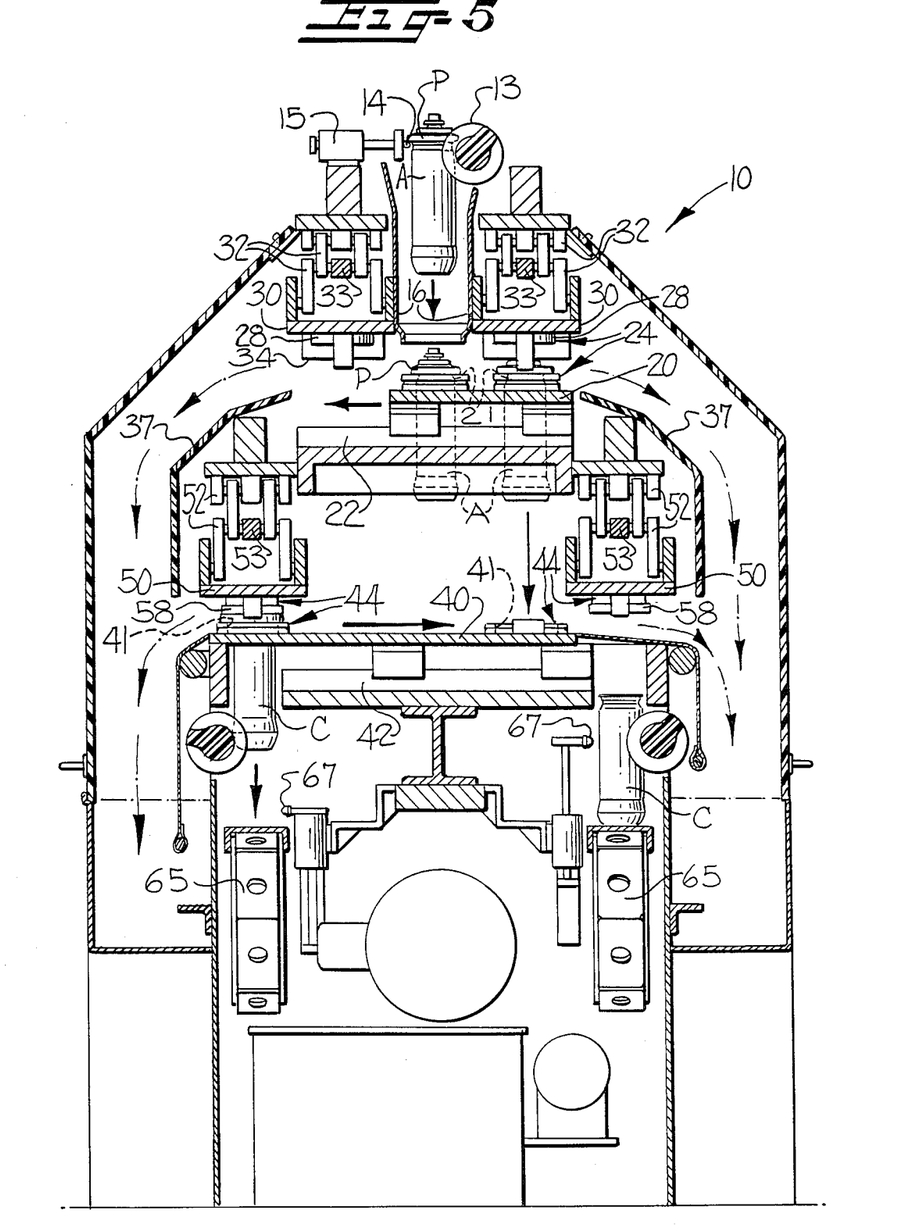
FIG. 5 is a sectional view, taken generally along the line 5—5 of FIG. 4.
Figure 6:
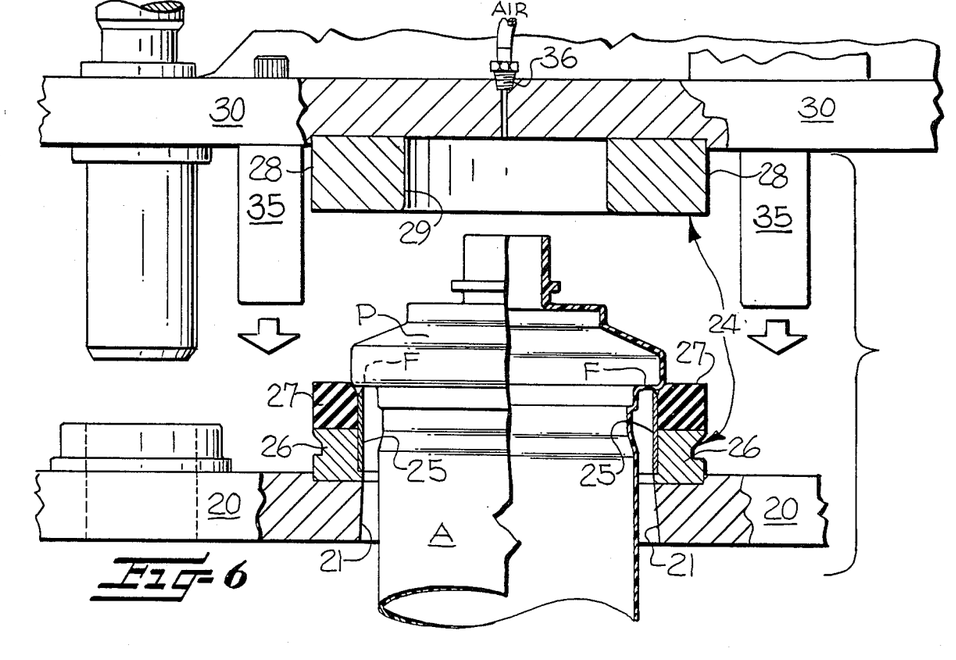
FIGS. 6 and 7 are enlarged partial elevational views, partly in section, illustrating the operating positions of the first stage cutting mechanism for removing the accommodation portion from the intermediate.

This first stage cutting operation includes a carriage device 20 in the form of a plate-like member having intermediate article receiving apertures 21 therein and suitably mounted on rails 22 for reciprocating generally horizontal movement by piston and cylinder mechanism 23 connected to carriage device 20 between two positions, i.e. the position illustrated in FIG. 5 and a position to the left as viewed in FIG. 5 and indicated by the arrow therein. The carriage device 20 receives intermediate articles A from the conveyor mechanism 12 within respective apertures 21 in each of the two positions and alternately reciprocates the intermediate articles A outwardly in opposite directions to two respective cutting positions.

For example (as viewed in FIGS. 4 and 5), four intermediate articles A would be received in the carriage device 20 in its position illustrated in FIG. 5 through the chute 16. The carriage device 20 would then be reciprocated to the left, as viewed in FIG. 5, by the piston and cylinder mechanism 23 and the intermediate articles A previously in the receiving position would then be placed in a cutting position outwardly to the left of the loading position under the chute 16 and the apertures 21 in the carriage device 20 which were previously in the cutting position would then be empty after the cut intermediate articles A are released therefrom, as described below, and would then be positioned in the loading position under the chute 16. This reciprocation of the carriage device 20 continues so that intermediate articles A may be received and loaded therein while other intermediate articles A already received are being cut.

Cutting mechanisms, generally indicated at 24, are provided for alternately cooperating with the carriage device 20 when the carriage device has received the intermediate articles A and moved the intermediate articles A to the respective cutting positions. As may be seen in FIGS. 4 and 5, four cutting mechanisms 24 are provided for cutting operations in each of the cutting positions of the carriage device 20 so that four intermediate articles A may be cut while the other four intermediate articles A are being loaded into the carriage device 20.

Each of the cutting mechanism 24 comprise a hollow inverted stationary circular rule die cutting device 25 (FIGS. 6–8) suitably mounted by supports 26 on the carriage device 20 around the apertures 21 for movement therewith and for receiving the intermediate articles A therein with the flange F area of the accommodation portion P resting on the rule die cutting device 25. There is provided a compressible rubber or other suitable cushioning strip 27 extending around and outside of the portion of the rule die cutting device 25 for additional support of the accommodation portion P of the intermediate article A.

Figure 7:
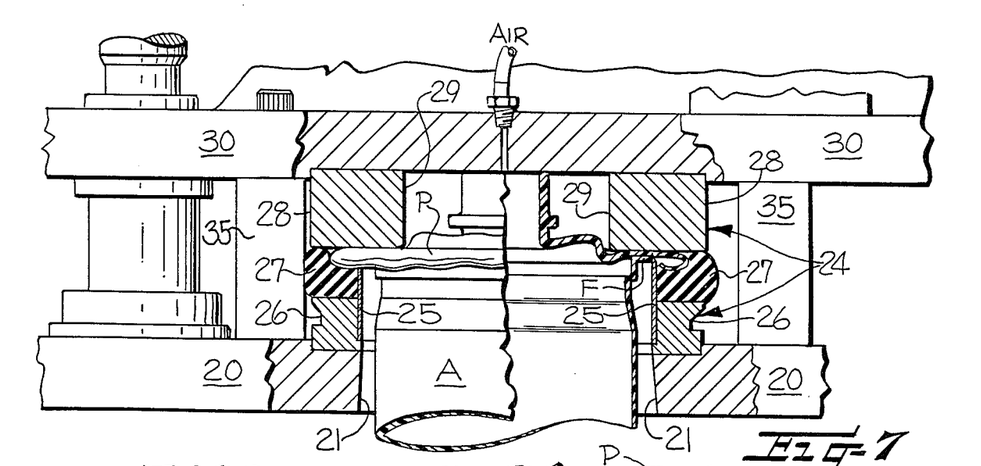
Figure 8:
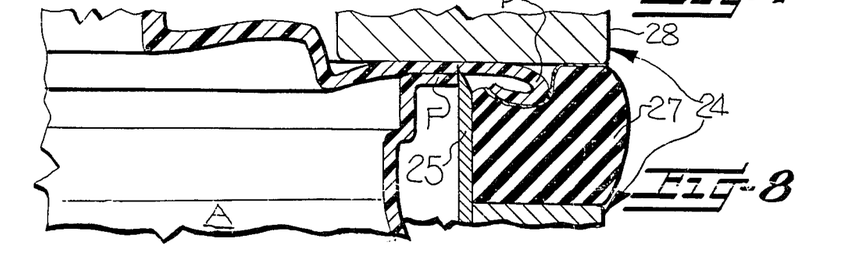
FIG. 8 is an enlarged partial sectional view of one side of the cutting mechanism in the position illustrated in FIG. 7 for showing the cutting of the accommodation portion through the flange area.
Figure 9:
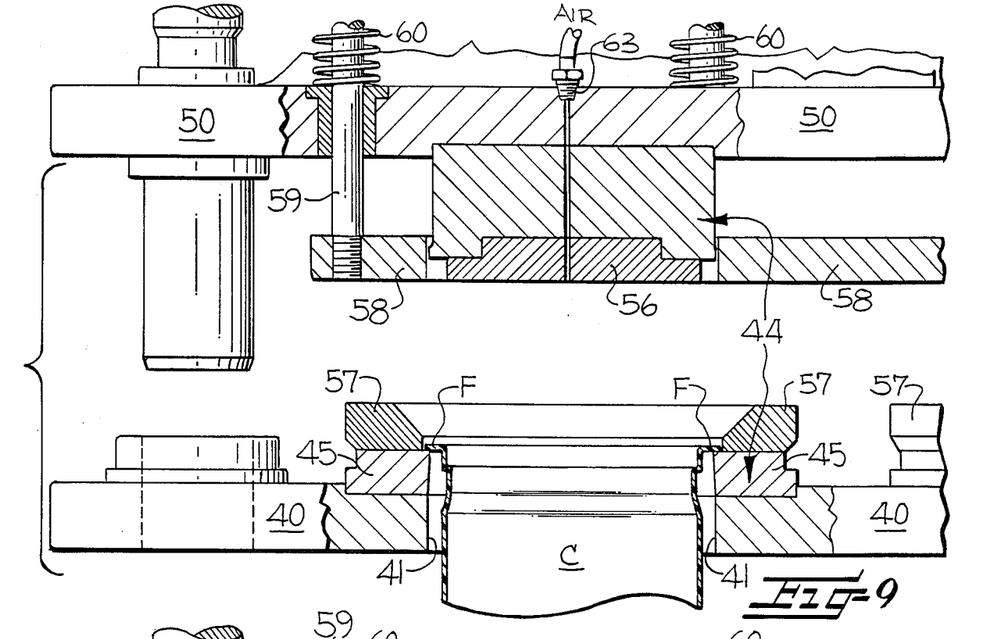
FIGS. 9 and 10 are enlarged partial elevational views, partly in section, illustrating the operating positions of the second stage trimming mechanism for trimming the cut flange of the wide-mouth container.
Figures 10, 11:
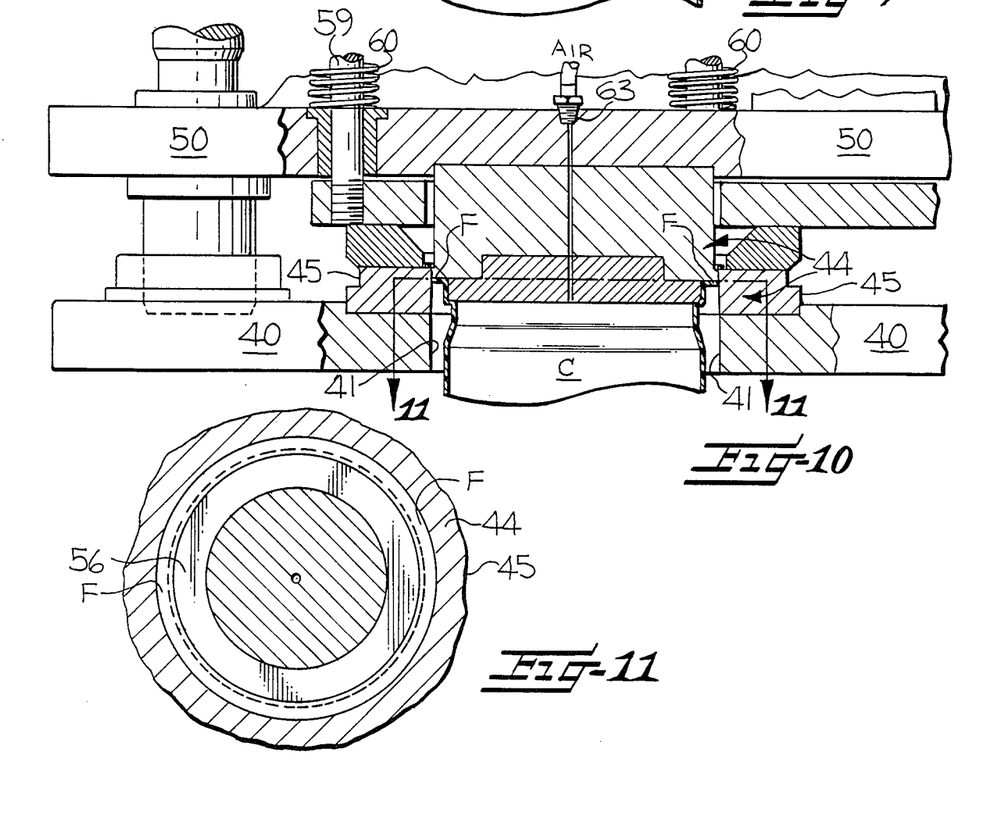
FIG. 11 is a section view, taken generally along the line 11—11 of FIG. 10.

Each cutting mechanism 24 further includes a pressure plate device 28 respectfully positioned above the carriage device 20 in each of the cutting positions thereof (FIGS. 4 and 5) and has an internal bore 29. These pressure plate devices 28 on each side of the chute 16 are commonly mounted on a member 30 carried by toggle mechanisms 32 (FIG. 4) which are suspended from a part of the apparatus frame and are connected to a rod 33 from a piston and cylinder mechanism 34. As the piston and cylinder mechanism 34 extends the rod 33, the toggle mechanisms 32 will cause the member 30 and the pressure plate devices 28 to move downwardly in an axial direction toward the rule die cutting device 25 (compare FIGS. 6 and 7). During this movement, the internal bore 29 will receive the top of the dome-like accommodation portion P of the intermediate article A to generally center the intermediate article A in the rule die cutting device 25 and compresses at least two wall thicknesses including the flange F area of the accommodation portion P against the rule die cutting device 25 for cutting the accommodation portion P through the flange F area by the rule die cutting device 25 and utilizing the other compressed wall thickness as an anvil means (FIGS. 7 and 8). This offers the advantage that the rule die cutting device 25 is not constantly contacting and wearing out an anvil in the apparatus 10 and a fresh anvil is produced each time a cutting operation is performed on an intermediate article A.

The cutting mechanisms 24 further include stop devices mounted for cooperating with the rule die cutting device 25 and the pressure plate device 28 for stopping movement of the pressure plate device 28 toward the rule die cutting device 25 at a position to ensure the cutting of substantially only the wall thickness of the flange F area of the accommodation portion of the intermediate article A by the rule die cutting device 25 during compression of the accommodation portion P (FIGS. 7 and 8). These stop mechanisms may be in the form of downwardly extending rod members 35 which may be adjustably positioned in their downward extension to abut against the carriage device 20 (FIG. 7). During such downward movement, the rubber support members 27 are also somewhat compressed (FIGS. 7 and 8).

Following the above described cutting operation of the intermediate article A, the resulting cut containers C move downwardly through the apertures 21 in the carriage device 20 under the influence of gravity and may be assisted in such movement by selective actuation of air jet nozzles 36 which are positioned in member 30 (FIGS. 6 and 7) for selectively ejecting an air stream into the cut containers C. The cut away parts of the accommodation portion P will fall under the force of gravity over guide plates 37 (FIG. 5) to generally the bottom of the apparatus 10 to be conveyed out of the apparatus 10 and recycled as desired (schematically indicated in FIG. 3). If necessary, means may be provided for assisting this removal of the cut away parts of the accommodation portion P, such as air jets or the like to move these parts from the above described cutting positions to the guide plates 37.

The cut containers C are then received in a second stage trimming operation wherein the cut containers C are rounded and centered at the wide-mouth and the cut flange F is trimmed to a precision concentric uniform flange while the wide-mouth is rounded and centered.

This second stage trimming operation includes a carriage device 40 in the form of a plate-like member having container receiving apertures 41 therein and suitably mounted on rails 42 for reciprocating generally horizontal movement by piston and cylinder mechanism 43 connected to carriage device 40 between two positions, i.e. the position illustrated in FIG. 5 and a position to the right as viewed in FIG. 5 and indicated by the arrow therein. The carriage device 40 receives cut containers C from the first carriage device 20 within respective apertures 41 (FIGS. 9 and 10) in each of the two positions and alternately reciprocates the cut containers C outwardly in opposite directions to two respective trimming positions.

For example, (as viewed in FIGS. 4 and 5), four cut containers C would be received in the carriage device 40 in its position illustrated in FIG. 5 from the first carriage device 20. The carriage device 40 would then be reciprocated to the right, as viewed in FIG. 5, by the piston and cylinder mechanism 43 and the cut containers C previously in receiving position would then be placed in a trimming position outwardly to the right of the loading position and the apertures 41 in the carriage device 40 which were previously in the trimming position would then be empty after the trimmed containers C are released therefrom, as described below, and would then be positioned in the loading position under the first carriage device 20. This reciprocation of the carriage device 40 continues so that the cut containers C may be received and loaded therein while other cut containers C already received are being trimmed.

Trimming mechanisms, generally indicated at 44, are provided for alternately cooperating with the carriage device 40 when the carriage device has received the cut containers C and moved the cut containers C to the respective trimming positions. As may be seen in FIGS. 4 and 5, four trimming mechanisms 44 are provided for trimming operations in each of the trimming positions of the carriage device 40 so that four cut containers C may be trimmed while the other four cut containers C are being loaded into the carriage device 40.

Figure 4:
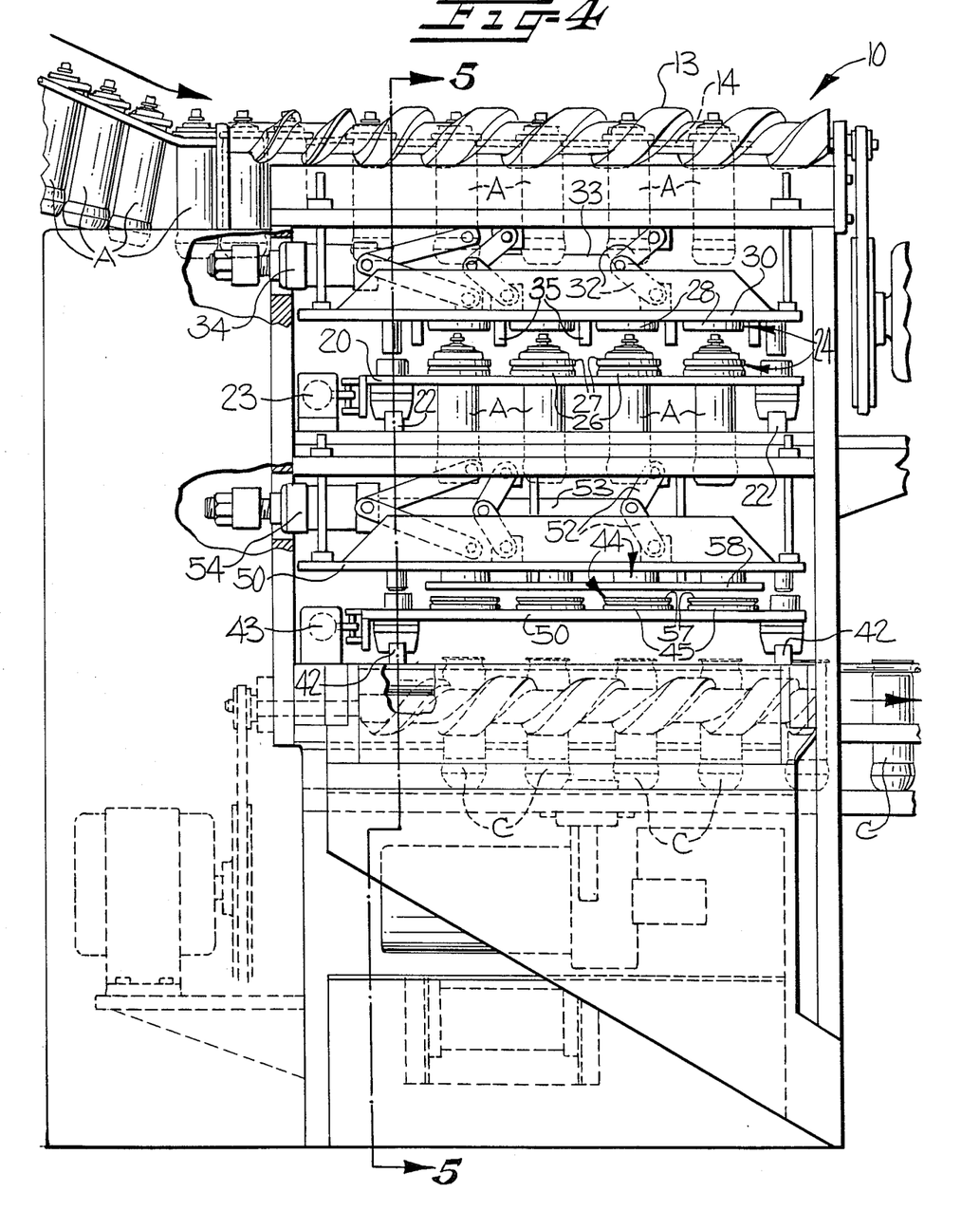
FIG. 4 is a side elevational view, partly in section, of a preferred embodiment of the apparatus of this invention.

Each of the trimming mechanisms 44 comprise a stationary hollow female circular die cutting device 45 (FIGS. 9-11) suitably mounted on the carriage device 40 around the apertures 41 for movement therewith and for receiving the cut containers C therein with the cut flange F resting on the female die cutting device 45. Each trimming mechanism 44 further includes a matched circular male die cutting device 46 respectively positioned above said carriage device 40 in each of the trimming positions thereof (FIGS. 4 and 5). These male die cutting devices 46 are commonly mounted on a member 50 carried by toggle mechanisms 52 (FIG. 4) which are suspended from a part of the apparatus frame and are connected to a rod 53 from a piston and cylinder mechanism 54. As the piston and cylinder mechanism 54 extends the rod 53, the toggle mechanisms 52 will cause the member 50 and the male die cutting devices 46 to move downwardly in the axial direction toward the female die cutting devices 45 (compare FIGS. 9 and 10).

The trimming mechanisms 44 further include a generally cylindrical pilot device 56 mounted on the forward end of the male die cutting device 46 (FIGS. 9 and 10) and having an outside diameter only slightly smaller than the inside diameter of the wide-mouth container C. As the male die cutting device 46 is moved toward the female die cutting device 45, the pilot device 56 will enter the container C through the wide-mouth for rounding and centering the wide-mouth of the container C and the male die cutting member 46 will cooperate with the female die cutting member 45 to trim the cut flange F and form a precision concentric uniform flange F.

The trimming mechanisms 44 further include means to aid in proper positioning of the pilot device 56 and male die cutting device 46 for trimming of the flange F. These means may be in the form of a hollow annular member 57 mounted on the female die cutting device 45 (FIGS. 9 and 10) and a plate member 58 carried by rods 59 extending through apertures in the member 50 and having compression springs 60 therearound. During downward reciprocation of the member 50 and the male die cutting device 46 and the pilot device 56, the plate 58 will come into contact with the annular member 57 and will be moved against the bias of compression spring 60 into engagement with the member 50 to stop forward movement of the member 50 to aid in properly positioning the male die cutting device 46 and pilot device 56 (FIG. 10) for the rounding and centering of the wide-mouth of the container C by the pilot device 56 and for trimming of the cut flange F of the container C by the male and female die cutting devices 46, 45.

The fabricated containers C are then released for downward movement under the influence of gravity to conveyor mechanisms 65 (FIGS. 4 and 5) for movement of the fabricated containers C out of the fabricating apparatus 10 for further conveying, if desired, to a packaging and shipping station. This downward movement of the fabricated containers C may be assisted by selective actuation of air jet nozzles 63 which are positioned in member 50 (FIGS. 9 and 10) for selectively ejecting an air stream into the fabricated containers C. The trimmed portions of the flange F from the fabricated containers C will fall under the force of gravity to generally the bottom of the apparatus 10 to be conveyed out of the apparatus 10 and recycled as desired (schematically indicated in FIG. 3). If necessary, means may be provided to assist, such as air jets or the like to move these trimmed portions of the flange F from the above described trimming positions.

These conveyor mechanisms 65 (FIGS. 4 and 5) may include a driven screw mechanism 66 positioned on one side of the fabricated containers C and a rail 67 positioned on the other side of the fabricated containers C so that the fabricated containers C are moved forwardly out of the apparatus 10 as the screw mechanisms 66 rotate.

Thus, there has been provided an apparatus 10 for fabricating a wide-mouth plastic container C, having an annular flange F extending radially outwardly at the wide-mouth, from a stretch blow-molded intermediate article A, having a dome-like accommodation portion P extending radially-outwardly at a flange area and upwardly and inwardly from the wide-mouth of a generally cylindrical body portion B, which produces a precision concentric uniform flange F around the wide-mouth of the fabricated container C and which provides a desired speed of fabrication in alternately and simultaneously performing its fabricating operations.

In the drawings and specification there have been set forth a preferred embodiment of this invention, and although specific terms are employed, they are used in a generic and descriptive sense only and not for purposes of limitation, the scope of the invention is defined in the following claims.

What is claimed is:

1. Apparatus for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and being characterized by producing a precision concentric uniform flange around the wide-mouth of the container; said apparatus comprising:

first means for receiving the intermediate article and for annularly cutting the accommodation portion through the flange area to remove the remainder of the accommodation portion and to leave an annular flange around the wide-mouth of the resulting container, said first means comprising a hollow inverted stationary rule die cutting means for receiving the intermediate article therein with the flange area of the accommodation portion resting on said rule die cutting means, a pressure plate means having an internal bore and mounted for reciprocating axial movement toward said rule die cutting means for receiving the dome-like accommodation portion within said internal bore to generally center the intermediate article in said rule die cutting means and for compressing at least two wall thicknesses including the flange area of the accommodation portion against said rule die cutting means during movement of said pressure plate means for cutting the accommodation portion through the flange area by said rule die cutting means and utilizing the other compressed wall thickness as an anvil means, and stop means mounted for cooperating with said rule die cutting means and said pressure plate means for stopping movement of said pressure plate means toward said rule die cutting means at a position to ensure the cutting of substantially only the wall thickness of the flange area by said rule die cutting means during compression of the accommodation portion; and    second means for receiving the resulting container, for rounding and centering the wide-mouth of the container and for trimming the cut flange to a precision concentric uniform flange while the wide-mouth is rounded and centered, said second means comprising a stationary hollow circular female die cutting means for receiving therewithin the wide-mouth container with the cut flange resting on said female die cutting means, a matched circular male die cutting means mounted for reciprocating axial movement toward and into said female die cutting means for cooperating therewith to trim the cut flange of the wide-mouth container, and generally cylindrical pilot means having an outside diameter only slightly smaller than the inside diameter of the wide-mouth container and mounted for axial movement with said male die cutting means to enter the container through the wide-mouth for rounding and centering the wide-mouth of the container during trimming by said male and female die cutting means to form the precision concentric uniform flange.

2. Apparatus for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and being characterized by producing a precision concentric uniform flange around the wide-mouth of the container and by the speed of operation in alternately and simultaneously performing its fabricating operations; said apparatus comprising:

first carriage means mounted for reciprocating generally horizontal movement between two positions for receiving the intermediate articles in each of the two positions and alternately reciprocating the articles outwardly in opposite directions to two respective cutting positions;

at least two cutting means positioned to alternately cooperate with said first carriage means when said first carriage means has received the intermediate articles and moved the articles to the respective cutting positions for annularly cutting the accommodation portion of the intermediate articles through the flange area to remove the remainder of the accommodation portion and to leave an annular flange around the wide-mouth of the resulting cut container and for releasing the resulting containers for generally downward vertical movement;

second carriage means positioned under said first carriage means and mounted for reciprocating generally horizontal movement between two positions for alternately receiving the cut containers from said first carriage means in each of the two positions and reciprocating the cut containers outwardly in opposite directions to two respective trimming positions; and    at least two trimming means positioned to alternately cooperate with said second carriage means when said second carriage means has received the cut containers and moved the containers to the respective trimming positions for rounding and centering the wide-mouth of the container and for trimming the cut flange to a precision concentric uniform flange while the wide-mouth is rounded and centered.

3. Apparatus for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and being characterized by producing a precision concentric uniform flange around the wide-mouth of the container and by the speed of operation in alternately and simultaneously performing its fabricating operations; said apparatus comprising:

conveyor means for receiving and feeding a plurality of the intermediate articles forwardly in a generally linear horizontal path of travel into said apparatus and including means for releasing the intermediate articles for generally downward vertical movement;

first carriage means positioned under said first conveyor means and mounted for reciprocating generally horizontal movement between two positions for receiving the intermediate articles from said first conveyor means in each of the two positions and alternately reciprocating the articles outwardly in opposite directions to two respective cutting positions;

at least two cutting means positioned to alternately cooperate with said first carriage means when said first carriage means has received the intermediate articles and moved the articles to the respective cutting positions for annularly cutting the accommodation portion of the intermediate articles through the flange area to remove the remainder of the accommodation portion and to leave an annular flange around the wide-mouth of the resulting cut container and for releasing the resulting containers for generally downward vertical movement;

second carriage means positioned under said first carriage means and mounted for reciprocating generally horizontal movement between two positions for alternately receiving the cut containers from said first carriage means in each of the two positions and reciprocating the cut containers outwardly in opposite directions to two respective trimming positions; and at least two trimming means positioned to alternately cooperate with said second carriage means when said second carriage means has received the cut containers and moved the containers to the respective trimming positions for rounding and centering the wide-mouth of the container and for trimming the cut flange to a precision concentric uniform flange while the wide-mouth is rounded and centered.

4. Apparatus, as set forth in claim 2 or 3, in which each of said cutting means comprises a hollow inverted stationary circular rule die cutting means mounted on said first carriage for receiving the intermediate article therein with the flange area of the accommodation portion resting on said rule die cutting means, and a pressure plate means respectively positioned above said first carriage means in each of the cutting positions thereof and having an internal bore and mounted for reciprocating axial movement toward said rule die cutting means for receiving the dome-like accommodation portion within said internal bore to generally center the intermediate article in said rule die cutting means and for compressing at least two wall thicknesses including the flange area of the accommodation portion against said rule die cutting means during movement of said pressure plate means for cutting the accommodation portion through the flange area by said rule die cutting means and utilizing the other compressed wall thickness as an anvil means.

5. Apparatus, as set forth in claim 4, in which each of said cutting means further comprises stop means mounted for cooperating with said rule die cutting means and said pressure plate means for stopping movement of said pressure plate means toward said rule die cutting means at a position to ensure the cutting of substantially only the wall thickness of the flange area by said rule die cutting means during compression of the accommodation portion.

6. Apparatus, as set forth in claim 2 or 3, in which each of said trimming means comprises a stationary hollow female circular die cutting means mounted on said second carriage means for receiving therewithin the wide-mouth container with the cut flange resting on said female die cutting means, a matched circular male die cutting means respectively positioned above said second carriage means in each of the trimming positions thereof and mounted for reciprocating axial movement toward and into said female die cutting means for cooperating therewith to trim the cut flange of the wide-mouth container, and generally cylindrical pilot means having an outside diameter only slightly smaller than the inside diameter of the wide-mouth container and mounted for axial movement with said male die cutting means to enter the container through the wide-mouth for rounding and centering the wide-mouth of the container during trimming by said male and female die cutting means to form the precision concentric uniform flange.

7. Apparatus for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and being characterized by producing a precision concentric uniform flange around the wide-mouth of the container and by the speed of operation in alternately and simultaneously performing its fabricating operations; said apparatus comprising:

first conveyor means for receiving and feeding a plurality of the intermediate articles forwardly in a generally linear horizontal path of travel into said apparatus and including means for releasing the intermediate articles for generally downward vertical movement;

first carriage means positioned under said first conveyor means and mounted for reciprocating generally horizontal movement between two positions for receiving the intermediate article from said first conveyor means in each of the two positions and alternately reciprocating the articles outwardly in opposite directions to two respective cutting positions;

at least two cutting means positioned to alternately cooperate with said first carriage means when said carriage means has received the intermediate articles and moved the articles to the respective cutting positions for annularly cutting the accommodation portion of the intermediate articles through the flange area to remove the remainder of the accommodation portion and to leave an annular flange around the wide-mouth of the resulting cut container and for releasing the resulting containers for generally downward vertical movement, each of said cutting means comprising a hollow inverted stationary circular rule die cutting means mounted on said first carriage means for receiving the intermediate article therein with the flange area of the accommodation portion resting on said rule die cutting means, a pressure plate means respectively positioned above said first carriage means in each of the cutting positions thereof and having an internal bore and mounted for reciprocating axial movement toward said rule die cutting means for receiving the dome-like accommodation portion within said internal bore to generally center the intermediate article in said rule die cutting means and for compressing at least two wall thicknesses including the flange area of the accommodation portion against said rule die cutting means during movement of said pressure plate means for cutting the accommodation portion through the flange area by said rule die cutting means and utilizing the other compressed wall thickness as an anvil means, and stop means mounted for cooperating with said rule die cutting means and said pressure plate means for stopping movement of said pressure plate means toward said rule die cutting means at a position to ensure the cutting of substantially only the wall thickness of the flange area by said rule die cutting means during compression of the accommodation portion;

second carriage means positioned under said first carriage means and mounted for reciprocating generally horizontal movement between two positions for alternately receiving the cut containers from said first carriage means in each of the two positions and reciprocating the cut containers outwardly in opposite directions to two respective trimming positions;

at least two trimming means positioned to alternately cooperate with said second carriage means when said second carriage means has received the cut containers and moved the containers to the respective trimming positions for rounding and centering the wide-mouth, of the container and for trimming the cut flange to a precision concentric uniform flange while the wide-mouth is rounded and centered and for releasing the trimmed containers for generally downward vertical movement, each of said trimming means comprising a stationary hollow female circular die cutting means mounted on said second carriage means for receiving therewithin the wide mouth container with the cut flange resting on said female die cutting means, a matched circular male die cutting means respectively positioned above said second carriage means in each of the trimming positions thereof and mounted for reciprocating axial movement toward and into said female die cutting means for cooperating therewith to trim the cut flange of the wide-mouth container, and generally cylindrical pilot means having an outside diameter only slightly smaller than the inside diameter of the wide-mouth container and mounted for axial movement with said male die cutting means to enter the container through the wide-mouth for rounding and centering the wide-mouth of the container during trimming by said male and female die cutting means to form the precision concentric uniform flange; and second conveyor means positioned under said second carriage means for receiving and feeding the fabricated containers out of said apparatus.

8. Apparatus, as set forth in claim 2, 3 or 7, in which said first carriage means receives a plurality of the intermediate articles in each of the two positions, in which there are a plurality of cutting means corresponding to the number of intermediate articles received by said first carriage means for alternately cooperating with said first carriage means in each of the respective cutting positions, in which said second carriage means receives in each of its respective positions the plurality of cut containers from each of the cutting positions of said second carriage means, and in which there are a plurality of trimming means corresponding to the number of cut containers received by said second carriage means in each of its respective trimming positions for cooperating with said second carriage means in each of its respective trimming positions.

9. Apparatus for fabricating a wide-mouth plastic container, having an annular flange extending radially outwardly at the wide-mouth, from a stretch blow-molded intermediate article, having a dome-like accommodation portion extending radially-outwardly at a flange area and upwardly and inwardly from the wide-mouth of a generally cylindrical body portion, and being characterized by producing a precision concentric uniform flange around the wide-mouth of the container; said apparatus comprising:

first means for receiving the intermediate article and for annularly cutting the accommodation portion through the flange area to remove the remainder of the accommodation portion and to leave an annular flange around the wide-mouth of the resulting container, said first means comprising a hollow inverted stationary rule is cutting means for receiving the intermediate article therein with the flange area of the accommodation portion resting on said rule die cutting means, a pressure plate means having an internal bore and mounted for reciprocating axial movement toward said rule die cutting means for receiving the dome-like accommodation portion within said internal bore to generally center the intermediate article in said rule die cutting means and for compressing at least two wall thicknesses including the flange area of the accommodation portion against said rule die cutting means during movement of said pressure plate means for cutting the accommodation portion through the flange area by said rule die cutting means and utilizing the other compressed wall thickness as an anvil means; and second means for receiving the resulting container, for rounding and centering the wide-mouth of the container and for trimming the cut flange to a precision concentric uniform flange while the wide-mouth is rounded and centered, said second means comprising a stationary hollow circular female die cutting means for receiving there within the wide-mouth container with the cut flange resting on said female die cutting means, a matched circular male die cutting means mounted for reciprocating axial movement toward and into said female die cutting means for cooperating therewith to trim the cut flange of the wide-mouth container, and generally cylindrical pilot means having an outside diameter only slightly smaller than the inside diameter of the side-mouth container and mounted for axial movement with said male die cutting means to enter the container through the wide-mouth for rounding and centering the side-mouth of the container during trimming by said male and female die cutting means to form the precision concentric uniform flange.

* * * * *

UNITED STATES PATENT AND TRADEMARK OFFICE
CERTIFICATE OF CORRECTION

PATENT NO. : 4,865,533
DATED : September 12, 1989
INVENTOR(S) : Philip G. Hart and Virgil L. Davis It is certified that error appears in the above-identified patent and that said Letters Patent is hereby corrected as shown below: On the title page:

IN THE REFERENCES CITED:

"1,195,504" should be -- 1,195,204 --.

Signed and Sealed this

Thirty-first Day of July, 1990

*Attest:*

HARRY F. MANBECK, JR.

*Attesting Officer*   *Commissioner of Patents and Trademarks*